United States Patent [19]

Asano et al.

[11] 4,400,492

[45] Aug. 23, 1983

[54] COLOR-DEVELOPER FOR PRESSURE-SENSITIVE RECORDING SHEETS

[75] Inventors: Makoto Asano, Yokohama; Saburo Kawashima, Yokosuka; Yoshimitu Tanabe; Hisamichi Murakami, both of Yokohama, all of Japan

[73] Assignee: Mitsui Toatsu Chemicals, Inc., Tokyo, Japan

[21] Appl. No.: 247,123

[22] Filed: Mar. 24, 1981

[30] Foreign Application Priority Data

Apr. 4, 1980 [JP] Japan .................................. 55-43547
Apr. 8, 1980 [JP] Japan .................................. 55-45198

[51] Int. Cl.³ .................... C08G 8/12; C08G 8/20; C08G 8/24; C08G 8/28
[52] U.S. Cl. .................................. 525/506; 282/27.5; 525/480; 525/481; 528/137; 528/139; 528/143; 528/144; 528/150; 528/153; 528/155; 528/161
[58] Field of Search ............ 528/137, 143, 144, 153, 528/139, 150, 155, 161; 525/480, 481, 506; 282/27.5

[56] References Cited

U.S. PATENT DOCUMENTS

| | | | |
|---|---|---|---|
| 2,208,331 | 7/1940 | Olin | 528/155 |
| 2,809,178 | 10/1957 | Turner et al. | 525/480 X |
| 3,516,845 | 6/1970 | Brockett | 117/36.2 |
| 3,663,256 | 5/1972 | Miller et al. | 282/27.5 |
| 3,672,935 | 6/1972 | Miller et al. | 117/36.8 |
| 3,723,156 | 3/1973 | Brockett et al. | 117/36.2 |
| 3,732,120 | 5/1973 | Brockett et al. | 117/16 |
| 3,737,410 | 6/1973 | Mueller | 260/59 |
| 3,988,386 | 10/1976 | Hesse et al. | 525/481 X |
| 4,025,490 | 5/1977 | Weaver | 263/53 R |
| 4,112,160 | 9/1978 | Kako et al. | 528/153 X |
| 4,165,102 | 8/1979 | Bodmer | 282/27.5 |
| 4,165,103 | 8/1979 | Bodmer | 282/27.5 |
| 4,173,684 | 11/1979 | Stolfo | 282/27.5 X |
| 4,216,299 | 8/1980 | Kikuga et al. | 525/491 |
| 4,216,300 | 8/1980 | Kikuga et al. | 525/491 |
| 4,235,769 | 11/1980 | Asano et al. | 528/161 X |
| 4,345,054 | 8/1982 | Takeda et al. | 525/480 |

FOREIGN PATENT DOCUMENTS

| | | |
|---|---|---|
| 842709 | 5/1970 | Canada . |
| 47-18868 | 5/1972 | Japan . |
| 51-84308 | 7/1976 | Japan . |
| 53-59519 | 5/1978 | Japan . |

*Primary Examiner*—Howard E. Schain
*Attorney, Agent, or Firm*—Fisher, Christen & Sabol

[57] ABSTRACT

Disclosed is a color-developer for pressure-sensitive recording sheets, comprising a co-condensate of a reaction intermediate of a p-substituted phenol and a trifunctional or higher phenol, or a polyvalent metal salt of said co-condensate, said reaction intermediate being obtained by the reaction of said p-substituted phenol under acidic conditions with formaldehyde or a substance capable of generating formaldehyde.

14 Claims, No Drawings

COLOR-DEVELOPER FOR PRESSURE-SENSITIVE RECORDING SHEETS

BACKGROUND OF THE INVENTION

1. Field of the Invention

This invention relates to a color-developer for pressure-sensitive recording sheets. More specifically, the invention relates to an improvement in a phenol-formaldehyde condensate used as a color-developer for pressure-sensitive recording sheets.

2. Description of the Prior Art

Generally, a pressure-sensitive recording sheet material consists of a sheet coated on one surface thereof with microcapsules containing a solution of an electron donating organic compound (a so-called pressure-sensitive dye) in an involatile hydrophobic solvent (to be referred to as a "CB", or Coated Back, sheet) and a second sheet coated on one surface thereof with an aqueous coating composition containing an electron accepting color-developer (to be referred to as a "CF", or Coated Front, sheet). When the two sheets are mated with their coated surfaces facing each other and printing pressure is applied by a ball-point pen, a typewriter or the like, the microcapsules are ruptured and the pressure-sensitive dye solution therein contacts the color-developer to form a colored mark. Accordingly, by using various combinations of the microcapsular layer and the color-developer layer, multiple copies can be produced at a time, or a colored mark can be formed by a single pressure-sensitive recording sheet (to be referred to as an "SC", or self-contained, sheet).

Examples of the pressure-sensitive dye used in such pressure-sensitive recording sheets include triphenylmethane dyes, acylleuco phenothiazine dyes, fluoran dyes, leucoauramine dyes, spiropyran dyes, and the like.

On the other hand, inorganic solid acids such as acid clay and activated clay, phenol-formaldehyde condensates, metal salts of salicyclic acid derivatives, etc. are used as electrophilic color-developers.

Among these color-developers, the phenol-formaldehyde condensates disclosed in U.S. Pat. No. 3,672,935, Japanese Patent Publication No. 18868/1972, etc. are widely used because of their excellent properties such as (1) their excellent color-developing performance, (2) the excellent coatability (or rheological properties) of an aqueous suspension thereof, and (3) the excellent water resistance of sheets coated therewith. Specifically, a p-phenylphenol-formaldehyde condensate is in widespread use as a color-developer for pressure-sensitive recording sheet materials of the multiple sheet type, and a p-alkylphenol/phenol/formaldehyde co-condensate such as the one disclosed in Japanese Laid-Open Patent application No. 84308/1976, as a color-developer for pressure-sensitive recording sheet materials of the single sheet type.

Various defects, however, have been pointed out regarding the p-phenylphenol-formaldehyde condensate as a color-developer for pressure-sensitive recording sheet materials of the multiple sheet type. These defects include the following. (1) Its color-developing ability, especially the rate of color development, is not sufficient. In particular, the initial density of black coloration in reaction with a fluoran-type pressure-sensitive dye such as 3-diethylamino-6-methyl-7-anilinofluoran is low, and at low temperatures its color-developing ability (the rate of color development) is very poor. (2) Marked yellowing occurs during light exposure. (3) Marked yellowing occurs in an atmosphere of an oxidizing gas such as $NO_x$. (4) It has poor stability to solvent (the phenomenon manifested by a colored image to disappear upon contact with plasticizers such as phthalate esters, gasoline, and oxygen-containing organic solvents such as alcohols and ketones). It is desired therefore to improve this color-developer with regard to these defects.

In the case of the p-alkylphenol/phenol/formaldehyde co-condensate used as a color developer for pressure-sensitive recording sheet materials of the single sheet type, it is also desired to (1) eliminate staining or backgrounding (spontaneous color development) during storage and greatly increase its color-developing performance, and (2) inhibit yellowing of the coated sheets during storage.

There has also been a strong demand for color-developers of high quality which can be used in pressure-sensitive recording sheet materials of both the single and the multiple sheet types.

Various improved techniques have been proposed in an attempt to meet the above desires. For examples, the prior patent documents disclose (1) a combination of (a) a p-substituted difunctional phenol/formaldehyde condensate with (b) kaolin clay and (c) a divalent metal salt such as zinc chloride (see Canadian Pat. No. 842,709, and U.S. Pat. No. 3,516,845); (2) a combination of a p-substituted phenol/formaldehyde polymer (substantially a p-phenylphenol/formaldehyde polymer) with an oil-soluble metal salt such as acetylacetonatozinc or zinc abietate (see U.S. Pat. No. 3,723,156); (3) the use, as a color-developer, of a zinc-modified phenol-formaldehyde novolak polymer obtained by subjecting a p-substituted phenol/formaldehyde polymer (substantially a p-phenylphenol/formaldehyde polymer) to hot-melt reaction with zinc hydroxybenzoate, acetylacetonatozinc, zinc dibenzoate, etc. (see U.S. Pat. Nos. 3,732,120 and 3,737,410); (4) the use, as a color-developer, of a metal-modified phenol-aldehyde novolak resin obtained by subjecting a p-substituted phenol/formaldehyde polymer to hot-melt reaction with zone alkanoates having 1 to 3 carbon atoms (see U.S. Pat. No. 4,025,490); and (5) a polyvalent metal salt of a co-condensate of at least one p-substituted difunctional phenol (specifically, p-phenylphenol, p-tert-octylphenol, p-tert-butylphenol) and at least one trifunctional or higher phenol (specifically, phenol, bisphenol A, bisphenolsulfone) (see U.S. Pat. Nos. 4,216,300 and 4,216,299 and Japanese Laid-Open Patent Publication No. 59519/1978).

Furthermore, U.S. Pat. Nos. 4,165,102 and 4,165,103 disclose a zinc-modified resin obtained by reacting a phenol/formaldehyde novolak resin (substantially a p-alkylphenol/formaldehyde novolak resin) with (A) zinc oxide or zinc carbonate and (B) ammonium benzoate or ammonium formate.

Among the combinations disclosed in Canadian Pat. No. 842,709 and U.S. Pat. No. 3,516,845, the combination of the phenol/formaldehyde polymer, kaolin and zinc chloride has an effect of improving color-developing performance and the light fastness of the resulting colored image, but is not practical because the strong acidity and the water-solubility of zinc chloride (1) markedly thicken an aqueous coating composition containing this combination to cause difficulty of its application, (2) cause a loss of the effect of the coating binder, resulting in a degradation in paper surface properties (adhesion strength), and (3) lead to a danger of leaching out of zinc chloride.

The metal-modified p-phenylphenol/formaldehyde resins disclosed in U.S. Pat. Nos. 3,723,156, 3,732,120, and 3,737,410 are improved in the density and light fastness of a colored image over the unmodified p-phenylphenol/formaldehyde polymer, but exhibit an increased tendency to yellowing in an atmosphere of an oxidizing gas such as $NO_x$. Hence, these modified resins still fail to meet the desires.

Among the polyvalent metal salts of condensates obtained by reacting at least one p-substituted difunctional phenol and at least one trifunctional phenol with formaldehyde as disclosed in Japanese Laid-Open Patent Publication No. 59519/1978, only a polyvalent metal salt of a co-condensate having p-phenylphenol as a base can exhibit color developing performance comparable to the p-phenylphenol/formaldehyde condensate now in widespread use. Pressure-sensitive recording sheets using these metal salts as color-developers show yellowing behaviors in an oxidizing gas atmosphere or during light exposure to the same or greater extent as or than those containing the p-phenylphenol/formaldehyde condensate as a color developer. Accordingly, the use of this type of color developer has not led to essential improvement of yellowing resistance. Furthermore, polyvalent metal salts of co-condensates having p-alkylphenols as a base have low color-developing performance and their rates of color development do not show sufficient improvement. Thus, these polyvalent metal salts have a low utilitarian value.

The zinc-modified p-octylphenol resins obtained by using zinc oxide or zinc carbonate and ammonium formate or ammonium benzoate, as disclosed in U.S. Pat. Nos. 4,165,102 and 4,165,103 do not give a sufficient density in color development, and a blue colored image obtained by reaction thereof with Crystal Violet Lactone has been found to fade spontaneously in the early stage, giving rise to a problem in practical applications.

Accordingly, these improved color-developers for pressure-sensitive recording sheets disclosed by the prior patent literature still have their own defects, and cannot fully meet the consumer's demands.

SUMMARY OF THE INVENTION

It is an object of this invention to provide a color-developer for pressure-sensitive recording sheet materials of the multiple sheet type, which has various improved properties, among which are:

(1) the color developing performance, above all the rate of color development (especially in the case of black coloration by reaction with 3-diethylamino-6-methyl-7-anilinofluoran as a main pressure-sensitive dye) is markedly improved, enabling a copy of high color density to be obtained immediately after color development, and the ultimate density of the developed color is greatly improved;

(2) the color-developing performance at low temperatures is markedly improved;

(3) the light fastness of a colored image is markedly improved;

(4) the solvent resistance of the colored image is increased; and (5) the yellowing tendency of a pressure-sensitive recording sheet containing the aforesaid color-developer during light exposure and in an oxidizing gas atmosphere is markedly reduced, and its storage stability is excellent.

A second object of this invention is to provide a color-developer which very much reduces a color staining phenomenon (backgrounding phenomenon by spontaneous color development during coating and storage) and has markedly improved color-developing performance (the rate of color development and the ultimate density) when used in pressure-sensitive recording sheet material of the single sheet type.

Still another object of this invention is to provide a color-developer which permits cost reduction when applied to pressure-sensitive recording sheets.

These objects of the invention are achieved by using as a color developer for pressure-sensitive recording sheets a co-condensate obtained by co-condensing a reaction intermediate of a p-substituted phenol with a trifunctional or higher phenol under neutral or acidic conditions, or a polyvalent metal salt of the co-condensate, said reaction intermediate being obtained by reacting said p-substituted phenol under acidic conditions with formaldehyde or a substance capable of generating formaldehyde.

DETAILED DESCRIPTION OF THE INVENTION

The color-developer for pressure-sensitive recording sheets in accordance with this invention comprises a formaldehyde co-condensate of a p-substituted phenol and a trifunctional or higher phenol obtained by reacting at least one p-substituted phenol of the general formula (I)

wherein R represents an alkyl group having 1 to 12 carbon atoms, a cycloalkyl group having 6 to 12 carbon atoms, an aralkyl group having 7 to 12 carbon atoms, an aryl group having 6 to 12 carbon atoms, or a halogen atom, under acidic conditions with at least an equimolar amount of formaldehyde or a substance capable of generating formaldehyde, and reacting the resulting reaction intermediate with a trifunctional or higher phenol (i.e., a phenol derivative having at least 3 sites reactive with the formaldehyde) under neutral or acidic conditions; and/or a polyvalent metal salt of the co-condensate.

As required, the color developer is finely pulverized, and further micropulverized in the wet state in the presence of a dispersant to form an aqueous suspension. Various ingredients for adjusting its properties as a pressure-sensitive recording sheet are mixed with the aqueous suspension to prepare an aqueous coating composition. The coating composition is coated on a support such as paper and dried to give a color-developer sheet for a pressure-sensitive recording sheet.

The color-developer of this invention is an innovative color-developer of high performance which can be used both in multiple sheet-type pressure-sensitive recording materials and in single sheet-type pressure-sensitive recording materials.

In the developer of this invention, the use of expensive p-phenylphenol as a starting phenol can be obviated, and it is possible to use p-alkylphenols, p-aralkylphenols, p-cycloalkylphenols, bisphenols and phenol which can be obtained at low costs and in great quantities as petrochemical derivatives. Thus, a diversity of materials can be used to produce the color-developer, and the cost of production can be reduced. This has a great industrial significance in that it finally leads to the reduced cost of the resulting pressure-sensitive recording sheets.

The color-developer comprising the p-substituted phenol/trifunctional or higher phenol/formaldehyde co-condensate and the metal salt of the co-condensate shows much better performance than the known phenol/formaldehyde condensate or the metal salt thereof. Such a performance is achieved by the synergistic effect of the use of the co-condensate obtained by the reaction of the reaction intermediate formaed between the p-substituted phenol and formaldehyde, with the trifunctional or higher phenol, and the conversion of the co-condensate into a metal salt.

The method of producing the p-substituted phenol/trifunctional or higher phenol/formaldehyde co-condensate used in the color developer of this invention differs greatly from a conventional method for producing a phenol/formaldehyde condensate used as a known color developer. According to the condensation of phenol and formaldehyde by a conventional technique, when a p-substituted phenol and a trifunctional or higher phenol are co-condensed with formaldehyde under acidic conditions, the trifunctional or higher phenol which has relatively higher reactivity with formaldehyde condenses preferentially, and consequently, the co-condensation reaction between the p-substituted phenol and the trifunctional or higher phenol does not take place sufficiently. The resulting condensate is a composition having a very wide molecular weight distribution ranging from the unreacted phenol monomer to a high molecular weight of more than 3,000. As a result, there is a marked melting point lowering phenomenon among the ingredients of the composition. Even when the ratio of formaldehyde to the p-substituted phenol and the trifunctional or higher phenol (F/P) is increased so as to increase the average molecular weight of the condensate, the resulting condensate has a low softening point. A color-developer comprising such a condensate or a metal salt of such a condensate cannot have sufficient color-developing performance (the rate of color development and the color density) because it contains large amounts of high-molecular-weight components having low solubility in solvents for dyes and phenolic monomers having no color developing ability. Furthermore, the conversion of the condensate into its metal salt does not result in a great improvement in performance.

As the ratio of the trifunctional or higher phenol to the p-substituted phenol is increased, the trifunctional or higher phenol may condense to a three-dimensional gel structure in the early stage of reaction depending upon the reaction conditions, so that the entire reaction mixture is likely to be gelled.

In contrast, the p-substituted phenol/trifunctional or higher phenol/formaldehyde co-condensate in the color developer of this invention is a co-condensate obtained by reacting a p-substituted phenol fully with an equimolar or larger amount of formaldehyde under acidic conditions, and reacting the resulting reaction intermediate with a trifunctional or higher phenol under neutral or acidic conditions. The reaction intermediate formed between the p-substituted phenol and an equimolar or larger amount of formaldehyde is a composition which may have at least 1 mole of formaldehyde added thereto per mole of the p-substituted phenol. It contains large amounts of reactive functional groups such as methylol groups and a phenylbenzodioxane group

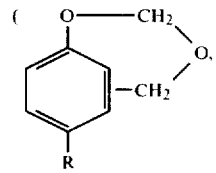

a cylic ether resulting from the addition to 2 moles of formaldehyde to 1 mole of the p-substituted phenol) in addition to methylene linkages.

Such a reaction intermediate easily condenses with the trifunctional or higher phenol in neutrality or acidity inducing dehydromethylenization as a main reaction. Accordingly, there is no formation of a three-dimensional gel structure by the reaction of the trifunctional or higher phenol with formaldehyde which may occur in the known condensing method. The ratio of the trifunctional or higher phenol to the p-substituted phenol can, therefore, be set at an arbitrary value in considerations of the properties of the product as a color-developer.

The co-condensate in accordance with the method of this invention has increased proportions of components having a molecular weight of about 300 to about 1000 and shows high solubility in solvents for dyes as compared with a co-condensate obtained by reacting a mixture of the p-substituted phenol and the trifunctional or higher phenol with formaldehyde. Moreover, since the number of components constituting the co-condensate decreases, and the degree of the co-melting phenomenon of the components is reduced. Thus, a co-condensate having a high solftening point can be obtained by using formaldehyde in a relatively low F/P ratio. Another characteristic feature is that the amount of the unreacted phenols having high sublimability, which gives rise to a quality problem in pressure-sensitive recording sheets, can be drastically reduced.

The p-substituted phenol/trifunctional or higher phenol/formaldehyde co-condensate of this invention attains higher performance as a color-developer by converting it into a polyvalent metal salt by various methods, and a color-developer having unexpectedly excellent performance can be obtained.

The p-substituted phenol used in the production of the color-developer of this invention is a compound expressed by the general formula (I) given hereinabove. Specific examples include (I) p-alkylphenols having an alkyl substituent with 1 to 12 carbon atoms, such as p-cresol, p-ethylphenol, p-iso-propylphenol, p-tert-butylphenol, p-sec-butylphenol, p-tert-amylphenol, p-hexylphenol, p-heptylphenol, p-tert-octylphenol, p-nonylphenol and p-dodecylphenol; (II) p-cycloalkylphenols typified by p-cyclohexylphenol; (III) p-aralkylphenols having an aralkyl substituent with 7 to 12 carbon atoms, such as p-benzylphenol, p-α-methylbenzylphenol, and p-α, α-dimethylbenzylphenol (to be sometimes referred to as p-cumylphenol); (IV) p-arylphenols typified by p-phenylphenol; and (V) p-halophenols typified by p-chlorophenol and p-bromophenol. These p-substituted phenols are used singly or as a mixture of two or more.

Among these p-substituted phenols, p-tert-butylphenol, p-tert-octylphenol, p-cyclohexylphenol, and p-α, α-dimethylbenzylphenol are preferred in view of the color and color-developer properties of the resulting resin. The p-cyclohexylphenol and p-α, α-dimethylbenzylphenol are especially preferred.

The trifunctional or higher phenol to be used in condensation with the reaction intermediate of the p-substituted phenol is a phenol having at least 3 sites reactive with formaldehyde, and examples include phenol, m-cresol, resorcinol, 4,4'-methylenebiphenol, 4,4'-ethylidenebiphenol, 4,4'-isopropylidenebiphenol, 4,4'-butylidenebiphenol, 4,4'-cyclohexylidenebiphenol, 4,4'-dihydroxydiphenyl, 2,2'-dihydroxydiphenyl and biphenolsulfone. These phenols may be uses singly or as a mixture of two or more. Phenol, 4,4'-isopropylidenebiphenol and 4,4'-cyclohexylidenebiphenol are especially preferred.

The substance capable of generating formaldehyde, or a source of formaldehyde, may be any compound which releases formaldehyde under the conditions of producing an intermediate between the p-substituted phenol and formaldehyde. Examples of formalin, paraformaldehyde, trioxane and tetraoxane.

The acid used in the reaction may be any of Brønsted acids such as sulfuric acid, p-toluenesulfonic acid, phosphoric acid, hydrochloric acid, oxalic acid and trichloroacetic acid and Lewis acids such as $ZnCl_2$ and $AlCl_3$. Hydrochloric acid and oxalic acid are preferred in view of the color of the resulting condensate, the reduced amount of the acid remaining in the condensate, etc.

An organic solvent is not always necessary in this reaction. If desired, however, the reaction may be carried out in a solvent capable of dissolving the p-substituted phenol. Examples of the solvent are aromatic hydrocarbons such as benzene, toluene and xylene, paraffinic hydrocarbons such as n-hexane and isooctaine, cycloparaffinic hydrocarbons such as cyclohexane and methylcyclohexane, halogenated hydrocarbons such as dichloroethane and trichloroethane, and alcohols such as methanol, ethanol and isopropanol.

The p-substituted phenol/trifunctional or higher phenol/formaldehyde co-condensate of this invention is obtained by reacting a p-substituted phenol with formaldehyde under acidic conditions and reacting the reaction intermediate with a trifunctional or higher phenol.

Specifically, there are used at least one p-substituted phenol, 0.7 to 1.0 mole, per mole of the total amount of phenols (the combined amount of the p-substituted phenol and the trifunctional or higher phenol used in the subsequent reaction), formaldehyde or a substance capable of generating formaldehyde, 0.2 to 10 parts by weight, per 100 parts by weight of the p-substituted phenol and the trifunctional or higher phenol combined, of an acid, and optionally 50 to 500 parts by weight, per 100 parts by weight of the p-substituted phenol, of an organic solvent. The reaction is carried out at 70° to 130° C. for 2 to 20 hours to form a reaction intermediate in which 70 to 100% of the used formaldehyde has reacted with the p-substituted phenol. The reaction intermediate so obtained is a product having at least 1 mole of formaldehyde added per mole of p-substituted phenol and containing large amounts of reactive functional groups such as methylol groups and the aforesaid phenylbenzodioxane groups in addition to methylene linkages.

Then, at least one trifunctional or higher phenol is added to the reaction mixture containing the reaction intermediate and optionally the formaldehyde or its source substance and the acid, and the intermediate reaction product of the p-substituted phenol is condensed with the trifunctional or higher phenol.

The amount of the trifunctional or higher phenol is 0.3 to 1.0 mole, preferably 0.5 to 0.9 mole, per mole of the p-substituted phenol. When the acid was added in a sufficient amount in the aforesaid intermediate-forming reaction, it is not necessary to add it anew at this stage. Alternatively, however, a required amount of the acid may be added at each stage. The reaction is performed at 80° to 120° C. for 0.5 to 10 hours. After the reaction, the reaction mixture is heated to remove the water and the solvent and thereby to obtain a p-substituted phenol/trifunctional or higher phenol/formaldehyde co-condensate. The co-condensate is micropulverized in a customary manner for use as a color-developer. Alternatively, the co-condensate may be precipitated as a fine powder by dissolving it in 0.4 to 2.0 moles, per mole of its phenolic hydroxyl groups, of an alkaline aqueous solution such as an aqueous solution of sodium hydroxide or potassium hydroxide and then adding an aqueous solution of an acid such as hydrochloric acid or sulfuric acid with stirring.

The mole ratio of formaldehyde to the entire phenols (p-substituted phenol + trifunctional or higher phenol) (F/P) is selected from the range of from 0.7 to 1.0.

The co-condensate obtained by the above method may be converted to polyvalent metal salts by various known methods, as required.

Preferred metal compounds used for converting the co-condensate into polyvalent metal salts include, for example, hydrochlorides, nitrates, carbonates, sulfates, phosphates, formates, acetates, propionates, benzoates, hydroxybenzoates, salicylates, isopropoxides, acetylacetone salts, oxides, and hydroxides of metals such as zinc, calcium, aluminum, magnesium, barium, cobalt, copper, manganese, nickel, tin, iron, cadmium, and zirconium. The zinc salts, magnesium salts and aluminum salts are especially preferred in view of the color and developer properties of the resulting resin.

All known methods of metal salt formation can be used in converting the co-condensate into polyvalent metals. Some examples are given below.

(1) A method which comprises charging the co-condensate, an ammonium compound such as ammonium hydrogen carbonate, ammonium carbonate and ammonium acetate, and a polyvalent metal salt (such as zinc dibenzoate, zinc hydroxybenzoate, zinc formate, zinc acetate, zinc propionate, magnesium acetate or nickel propionate), and subjecting them to hot-melt reaction at 130° to 200° C. in the air or in an atmosphere of an inert gas such as $N_2$ and He, and then cooling the reaction mixture.

(2) A method which comprises dissolving the co-condensate in an aqueous solution of sodium hyroxide, potassium hydroxide or the like, then adding a suitable amount of an aqueous solution of a water-soluble polyvalent metal salt (such as zinc chloride, aluminum chloride or nickel sulfate) to the solution to preform double decomposition reaction, and thereafter filtering and drying the reaction product.

(3) A method which comprises dissolving the co-condensate in a low-boiling hydrophilic organic solvent (such as ethanol, methanol or acetone) containing sodium hydroxide, potassium hydroxide or the like to form a solution of a phenolate of the co-condensate, thereafter adding a solution of a polyvalent metal salt such as zinc chloride, calcium chloride, magnesium chloride or nickel chloride in a hydrophilic organic solvent to perform double decomposition in the hydrophilic organic solvent and thereafter discharging the product into water and drying it, or after the double decomposition, heating the product to remove the solvent.

(4) A method which comprises subjecting the co-condensate to hot-melt reaction with zinc oxide or zinc carbonate in the presence of an ammonium salt of benzoic acid or formic acid.

The p-substituted phenol/trifunctional or higher phenol/formaldehyde co-condensate or the polyvalent metal of the co-condensate obtained by the methods illustrated above is generally micropulverized in the presence of a dispersing agent in a wet-type pulverizing apparatus such as a ball mill, attriter or sand grinder to form an aqueous suspension. The aqueous suspension is coated on a support such as paper and dried to fom a color-developer sheet for pressure-sensitive recording materials.

In the developer of this invention, as the mole ratio of formaldehyde to the phenols increases, the average degree of condensation of the phenol resin tends to increase and the rate of color development tends to decrease. The mole ratio of formaldehyde to the phenols is determined so that the resulting co-condensate or its polyvalent metal salt has a softening point (measured by the ring-and-ball method in JIS K-2531) of 70° to 140° C., preferably 80° to 110° C. If the softening point is below 70° C., the operations of its pulverization and formation into an aqueous suspension are difficult. On the other hand, when it exceeds 140° C., the color developing performance of the co-condensate or its polyvalent metal salt is reduced so that it is not feasible in practical applications.

In forming the polyvalent metal salt of the co-condensate by the above-exemplified methods, the amount of the polyvalent metal salt used is 1 to 8% by weight, preferably 2 to 6% by weight, as metal based on the weight of the co-condensate. If the amount of the metal salt is less than 1% by weight, the effect of increasing color-developing performance by metal salt formation is small, and if it exceeds 8% by weight, there is no longer any new effect of improving the performance, and the resulting metal salt is difficult to form into an aqueous suspension.

In making a pressure-sensitive recording sheet using the color-developer of this invention, an aqueous coating composition containing the color-developer of this invention produced as above is prepared. In preparing the aqueous coating composition, not only the color-developing agent of this invention as a main ingredient, but also (1) an inorganic or organic pigment, (2) a pigment dispersing agent, (3) a coating binder, and (4) other various additives are added in order to adjust the surface properties of the pressure-sensitive recording sheet.

Examples of the inorganic or organic pigment (1) are kaolin, bentonite, talc, calcium carbonate, barium sulfate, aluminum oxide (alumina), silicon oxide (silica), satin white, titanium oxide, zinc oxide, and polystyrene emulsion. Examples of the pigment dispersing agent (2) are sodium meta-phosphate, sodium hexamethylphosphate, polyphosphate salts such as sodium tripolyphosphate, poly(sodium acrylate) and poly(sodium carboxylate). Examples of the coating binder (3) include aqueous solutions of modified starches such as oxidized starch, enzyme-treated starch, urea phosphoric acid starch and alkylated starch, aqueous solutions of water-soluble synthetic polymers such as polyvinyl alcohol, hydroxyethyl cellulose, carboxymethyl cellulose and methyl cellulose, synthetic rubber latices such as a styrene-butadiene latex (SBR) and a methyl methacrylate/butadiene latex (MBR), a vinyl acetate polymer emulsion and a vinyl acetate-ethylene copolymer emulsion. Examples of the other additives (5) include fluorescent bleaching agents, antifoamers, viscosity controlling agents, dusting inhibitors, slime control agents, lubricants, and water-proofing agents.

If desired, the aqueous coating composition may also contain another component having color developing ability, for example (1) a natural inorganic solic acid such as activated clay, (2) a phenolic resin such as a p-phenylphenol/formaldehyde condensate, (3) a metal salt of a substituted salicyclic acid such as 3,5-di-α-methylbenzylsalicylic acid or 3-phenyl-5-α,α-dimethylbenzylsalicyclic acid, or (4) a sulfonic acid derivative such as polystyrenesulfonic acid.

A color-developer sheet for a pressure-sensitive recording sheet which contains the color-developer of this invention is prepared by coating the resulting aqueous coating composition on a support such as paper. The amount of the aqueous coating composition is generally at least 0.5 g/m$^2$, preferably 1 to 10 g/m$^2$, as the dry weight. The color-developing performance of the pressure-sensitive recording sheet having coated thereon an aqueous coating composition containing as a main color-developer the p-substituted phenol/trifunctional or higher phenol/formaldehyde co-condensate and/or its polyvalent metal salt in accordance with this invention depends mainly upon the concentration of the color-developing component in the aqueous coating composition, and the application of the color-developer in an amount of more than 10 g/m$^2$ is disadvantageous both in performance and economy.

The color-developer of this invention has much better performance [color-developing performance (the rate of color development is faster, and the density of the developed color is higher), weatherability, oil resistance] than conventional known color-developers both for multiple and single sheet type pressure-sensitive recording materials, and can give pressure-sensitive recording sheets having very high merchandise values.

For use in multiple sheet-type pressure-sensitive recording materials, the color-developer of this invention has the following characteristics.

(1) It has excellent color-developing performance both in the rate of color development and the ultimate density reached of the developed color, and shows much improved color developing ability at low temperatures.

(2) The yellowing resistance of a sheet coated with the color-developer increases, and the degree of staining owing to oxidation during exposure to light and in an oxidizing gas atmosphere is much lower than in the case of the heretofore used p-phenylphenol/formaldehyde condensate.

(3) A colored image developed by the reaction of the color developer with a dye has excellent fastness characteristics.

(4) It has excellent stability to solvent. For example, the degree of disappearance of a colored image upon contact with gasoline or an oxygen-containing organic solvent such as dioctyl phthalate is reduced.

(5) The colored image has excellent water resistance.

Accordingly, by using the color-developer of this invention, pressure-sensitive recording sheet materials of the multiple sheet type having markedly better overall properties than the conventional pressure-sensitive recording sheet materials can be obtained.

Furthermore, for use in pressure-sensitive recording sheet materials of the single sheet type, the color-developer of this invention exhibits much better color-developing performance (the rate of color development and the ultimate density reached of the developed color) and better storage stability than the previously used p-octylphenol/phenol/formaldehyde co-condensate, and pressure-sensitive recording sheet materials of the single sheet type having excellent quality can be obtained. Since a pressure-sensitive recording sheet material of the single type, or a self-contained pressure-sensitive recording sheet, contains microcapsules of a solution of a pressure-sensitive dye in an involatile hydrophobic solvent and fine particles of a color developer which are present in contact with each other on the same surface, a problem of spontaneous color development (to be referred to as staining or backgrounding) during coating or storage (especially under high-temperature high-humidity conditions) arises, and therefore, a high level of coating technique is required.

The staining becomes remarkable under wet heat, and its degree varies greatly with the type of the color-developer used. The color-developer of this invention is characterized by the fact that despite its much better color developing performance than various color developers proposed heretofore, it has a very much reduced tendency to spontaneous color development under wet heat conditions. Accordingly, the color-developer of the invention has made it possible to broaden the area of usage of single sheet-type, or self-contained, pressure-sensitive recording sheet materials whose application has heretofore been limited owing to the limited color-developing performances of the conventional color-developers.

The following Examples, Comparative Examples and Referential Examples illustrate the present invention more specifically.

In the Referential Examples, aqueous suspensions of color-developers, aqueous coating compositions, and pressure-sensitive recording sheets (CF sheets and SC sheets) were prepared by the following methods, and the properties of the pressure-sensitive recording sheets were measured by the following methods.

I. Preparation of an Aqueous Suspension of a Color Developer

Forty parts by weight of each of the color developers obtained in Examples or Comparative Examples, 2.0 parts by weight of a polymeric anionic surfactant and 58 parts by weight of water were dispersed by a sand grinding mill to form an aqueous suspension having an average particle size of 2 microns.

II. Preparation of an Aqueous Coating Composition

An aqueous coating composition was prepared using the aqueous suspension of the color developer prepared as in I in accordance with the following formulation.

|  | (parts by weight) |
|---|---|
| Kaolin clay | 13 |
| Calcium carbonate | 2 |
| Sodium meta-phosphate | 0.1 |
| Oxidized starch | 15 (15% aqueous solution) |
| Styrene-butadiene latex | 2.5 (50% aqueous dispersion) |
| Aqueous suspension of the color-developer | 6.0 |
| Water | 13.9 |
| Total | 52.5 |

III. Production of a Pressure-Sensitive Recording Sheet (a) Method of Producing a CF sheet (a Pressure-Sensitive Recording Sheet Material of the Multiple Sheet Type)

The aqueous coating composition prepared as in II above was coated on a sheet of commercially available fine quality paper having a basis weight of 50 g/m$^2$ by a bar coater and dried so that the dry weight of the coating composition was 6.0 g/m$^2$, thereby forming a CF sheet.

(b) SC Sheet (a Pressure-Sensitive Record Sheet Material of the Single Sheet Type)

(1) A mixture (100:10 as the dry ratio) of microcapsules containing fine liquid droplets of diisopropylnaphthalene having dissolved therein 3 parts by weight of Crystal Violet Lactone (obtained by the G-A coacervation method) and an aqueous solution of oxidized starch was coated on a sheet of fine quality paper having a basis weight of 50 g/m$^2$ and dried so that the dry amount of the coating was 5 g/m$^2$. Then, the aqueous coating composition containing the color-developer prepared as in II above was coated on top of the coated layer to prepare an SC sheet capable of producing a blue color.

(2) An SC sheet capable of producing a black color was prepared in the same way as in (1) above except that microcapsules containing diisopropylnaphthalene having dissolved therein 5% of 3-diethylamino-6-methyl-7-anilinofluoran were used instead of the microcapsules used in (1) above.

IV. Methods of Measuring the Various Properties of Pressure-Sensitive Recording Sheets (a) Color-Developing Performance of the CF Sheet (Color Development by Typewriter and Calendar Roll Impressions)

(i) Color development by typewriter impression (T.I)

In order to measure the performance of the CF sheet to develop a color with a blue color-forming CB sheet and a black color-forming CB sheet which are generally used, the CF sheet and (a) a commercially available blue color-forming CB sheet contaning Crystal Violet Lactone as a main pressure-sensitive dye or (b) a commercially available black color-forming CB sheet containing 3-diethylamino-6-methyl-7-anilinofluoran as a main pressure-sensitive dye were laid one on top of the other with their coated surfaces facing each other, and printing pressure was applied by an electrical typewriter to develop a color. The density of the developed color was determined by measuring the reflectance of the CF sheet by means of Model TSS Hunter Colorimeter (manufactured and sold by Toyo Seiki Co., Ltd., Japan) having an amber filter. The initial density of the developed color was measured 15 seconds after the color development by typewriter impression, and the ultimate density of the developed color was measured 48 hours after the color development. The density of the developed color is expressed in reflectance (%), and lower reflectance values show higher densities of the developed colors. Furthermore, when the initial density of the developed color is higher and the difference between the initial density and the ultimate density is smaller, the rate of color development is higher and the color developing performance is better in practical applications.

In order to examine spontaneous fading of the colored image in the early stages, the density of the developed color for 10 days after the color development was measured. When the reflectance value becomes high by measurement after 10 days, it means that the colored image tends to fade in the early stage.

(ii) Color development by calendar roll impression (C.I)

Separately, the CF sheet and the blue color-forming CB sheet were laid one upon the other with their coated surfaces facing each other, and pressure was applied by a calender roll under a load of 100 kg/cm$^2$ to develop a color. The density of the developed color one hour after the color development was measured by the Hunter Colorimeter having an amber filter, and was expressed in reflectance (%).

The pressure-sensitive recording sheets and the CB sheets used were stored, and the color developing tests were conducted, in a constant-temperature constant-humidity room air-conditioned to 20° C. and 65% RH in accordance with JIS P8111-1976 (Pre-treatment of Test Sheets). Furthermore, before the color-development tests, the CF sheets and SC sheets were moisture-controlled for a day and night in the above constant-temperature and constant-humidity room.

(iii) Color developability at low temperatures

The color developability of a pressure-sensitive recording sheet tends to decrease at low temperatures, and this tendency is especially remarkable in forming a black color. This disadvantage has precluded widespread acceptance of pressure-sensitive recording sheets in districts of cold climate.

By typewriter impression, the black color development of the CF sheet whose developing performance depends greatly on temperature was tested at 10° C. Both the CB sheet and the CF sheet were temperature-controlled for a day and night in a constant-temperature room at 10° C. before the testing.

(b) Resistance to Yellowing of the CF Sheet (i) Resistance to yellowing of the CF sheet by exposure to direct sunlight The CF sheet was exposed to direct sunlight for 10 hours, and the reflectance of the CF paper was measured by the Hunter Colorimeter having a blue filter before and after the sunlight exposure. Higher reflectance values show lesser degrees of yellowing by light.

(ii) Resistance to yellowing of the CF sheet in an oxidizing gas atmosphere (yellowing resistance during storage)

To examine the degree of yellowing of the surface of the CF sheet during long-term storage, especially during storage in an oxidizing gas atmosphere, the CF sheet was exposed for 45 minutes to an atmosphere of $NO_x$ gas and its reflectance (using an amber filter) was measured before and after the gas exposure in accordance with JIS L-1055-1961 (Method for testing the degree of nitrogen oxide gas fastness of dyeings and dyes).

Higher reflectance values show lesser yellowing of the sheet surface after $NO_x$ exposure.

(c) Resistance to Light Fading of the CF Sheet Having a Color Developed Thereon

The CF sheet having a color developed by typewriter impression as described hereinabove was exposed for 2 hours to an ultraviolet carbon arc fadeometer (manufactured by Suga Testing Machine Co., Ltd.) and its reflectance (using an amber filter) was measured before and after the exposure. Lower reflectance values show that the colored image remains deep in color after light exposure.

(d) Solvent Resistance of the CF Sheet Having a Color Developed Thereon (i) Color fading resistance to plasticizers Microcapsules containing dioctyl phthalate (DOP), a widely used plasticizer for vinyl chloride resins, were prepared by the known G-Aa coacervation method, and coated on fine quality paper having a basis weight of 40 g/m$^2$ and dried so that the dry amount of the coating was 4.0 g/m$^2$, thereby forming a DOP sheet. The microcapsular surface of the DOP sheet was superimposed on the blue colored surface of the CF sheet (the blue color being developed by typewriter impression), and the assembly was subjected to calender rolling under a linear pressure of 100 kg/cm$^2$ to cause DOP in the microcapsules to migrate to the colored surface of the CF sheet. The reflectance (using an amber filter) of the CF sheet one day later was measured.

When the reflectance after the test is lower and its difference from the ultimate reflectance of the developed color in the color development by typewriter impression is smaller, the tendency of color fading by the plasticizer is less, leading to a lower frequency in the trouble of image disappearance which occurs, for example, during the long-term storage of pressure-sensitive recording sheets (having a color formed therein) in files made of vinyl chloride resins.

(ii) Color fading by gasoline

The CF sheet having a blue color developed thereon was dipped for 1 second in gasoline, and the degree of disappearance of the colored image was observed qualitatively. The degree of the disappearance of the colored image is expressed as follows:

O: No change;
Δ: Disappeared to some extent;
X: Completely disappeared.

(e) Degree of Staining of the SC Sheet Under Wet Heat Conditions (Wet Heat Soiling Resistance)

The SC sheet was stored for 2 hours in a constant-temperature constant-humidity vessel kept at 50° C. and a relatively humidity of 95%. The reflectances before and after the testing ($L_0$ and $L_1$) were measured by the Hunter Colorimeter having an amber filter. Higher reflectance values after the testing show lesser degrees of spontaneous staining under wet heat conditions, and less backgrounding during long-term storage.

EXAMPLE 1

In a glass reaction vessel, 206 g (1 mole) of p-tert-octylphenol, 59.0 g (1.57 moles) of 80% paraformaldehyde and 4.5 g of oxalic acid dihydrate were reacted for 12 hours under water reflux (100° C.) to form a reaction intermediate. After performing the reaction for 12 hours, 87% of the formaldehyde used was consumed. The mole ratio of formaldehyde to p-tert-octylphenol (Fa/POP) was 1.37:1. Phenol (70.5 g; 0.75 mole) was added to the reaction intermediate and reacted at 100° C. for 2 hours. The reaction mixture was dehydrated at atmospheric pressure and then at reduced pressure by heating it to a temperature of 165° C. to give a pale yellow transparent p-tert-octylphenol/formaldehyde co-condensate (softening point 98° C.).

EXAMPLE 2

When 212 g (1 mole) of p-α-α-dimethylbenzylphenol, 110.3 g (1.36 moles) of 37% formalin and 10.6 g of 10% hydrochloric acid were reacted for 6 hours under water reflux (110° C.), there was obtained a reaction intermediate [the mole ratio of formaldehyde to p-α,α-dimethylbenzylphenol (Fa/p-α,α-dimethylbenzylphenol) = 1.22:1] consuming 90% of the used formaldehyde.

Phenol (56.4 g; 0.6 mole) was added to the reaction intermediate, and reacted at 100° C. for 1 hour. The reaction mixture was dehydrated at atmospheric pressure and subsequently at reduced pressure by heating it to a temperature of 165° C. to give a pale yellow transparent p-60, α-dimethylbenzylphenol/phenol/formaldehyde co-condensate (softening point 92° C.).

EXAMPLE 3

176 g (1 mole) of p-cyclohexylphenol, 54.0 g (1.44 moles) of 80% paraformaldehyde and 0.8 g of trichloroacetic acid were dissolved in 200 ml of iso-octane, and reacted for 5 hours at the boiling point (99° C.) of the iso-octane. There was obtained a reaction intermediate consuming 92% of the formaldehyde used (the mole ratio of formaldehyde to p-cyclohexylphenol, Fa/PCHP=1.32:1).

Phenol (75.2 g; 0.8 mole) was added to the reaction intermediate, and reacted at 99° C. for 2 hours. The reaction mixture was then heated to 170° C. to remove water and the solvent and thereby to give a pale yellow transparent p-cyclohexylphenol/phenol/formaldehyde co-condensate (softening point 105° C.).

EXAMPLE 4

206 g (1 mole) of p-tert-octylphenol, 220 g (1 mole) of p-nonylphenol, 100.1 g (2.67 moles) of 80% paraformaldehyde and 0.8 g of p-toluenesulfonic acid were reacted under water reflux at 100° C. for 10 hours. A reaction intermediate was obtained consuming 85% of the used formaldehyde. Phenol (94 g; 1 mole) was added to the reaction intermediate, and reacted for 3 hours. The reaction mixture was then heated to 170° C. to dehydrate it and thereby to give a pale brown p-tert-octylphenol/p-nonylphenol/phenol/formaldehyde co-condensate.

EXAMPLE 5

176 g (1 mole) of p-cyclohexylphenol, 42.2 g (1.13 moles) of 80% paraformaldehyde and 3.5 g of oxalic acid were dissolved in 300 ml of cyclohexane, and reacted for 14 hours at the boiling point of the cyclohexane to give a reaction intermediate consuming 82% of the formaldehyde used. 83.4 g (0.31 mole) of 4,4'-cyclohexylidenebiphenol and 23.5 g (0.25 mole) of phenol were added to the reaction intermeidate, and reacted for 4 hours. Then, the reaction mixture was heated to 160° C. to remove water and the solvent and thereby to give a pale yellow p-cyclohexylphenol/4,4'-cyclohexylidenebiphenol/phenol/formaldehyde co-condensate (softening point 108° C.).

COMPARATIVE EXAMPLE 1

164 g(1 mole) of p-tert-amylphenol, 64 g (0.68 mmole) of phenol, 47.8 g. (1.27 moles) of 80% paraformaldehyde and 2.11 g of oxalic acid were reacted under water reflux for 6 hours, and then the reaction mixture was heated to 160° C. to deydrate it and complete the reaction. There was obtained a p-tert-amylphenol/phenol/formaldehyde co-condensate having a sotening point of 95° C.

COMMPARATIVE EXAMPLE 2

212 g (1 mole) of p-α,α-dimethylbenzylphenol, 54.6 g (0.58 mole) of phenol, 50.4 g (1.34 moles) of 80% paraformaldehyde and 2.7 g of oxalic acid were reacted under water reflux for 6 hours, and the reaction mixture was then heated to 170° C. to dehydrate it and thereby to give a pale yellow transparent p-α,α-dimethylbenzylphenol/phenol/formaldehyde co-condensate having a softening point of 90° C.

COMPARATIVE EXAMPLE 3

375 g. (1.8 moles) of p-tert-octylphenol, 75 g (0.8 mole) of phenol, 50 g (0.22 mole) of 4,4'-isopropylidenebiphenol (bisphenol A), 215 g (2.65 moles) of 37% formalin, 10 g of oxalic acid and 100 g of xylene were put into a reactor, and they were refluxed for 7 hours at the boiling point of the water-xylene azeotrope. The reaction mixture was then heated to 170° C. while removing water and the solvent, thereby giving a p-tert-octylphenol/phenol/bisphenol A/formaldehyde co-condensate having a softening point of 85° C.

COMPARATIVE EXAMPLE 4

170 g (1 mole) of p-phenylphenol, 65 g (0.8 mole) of 37% formalin, 10 cc of conc. hydrochloric acid, 1.0 g of oxalic acid dihydrate and 40 cc of water were condensed under water reflux for 10 hours. The reaction mixture was then heated and dehydrated, and heated to 170° C. to complete the reaction. There was obtained a p-phenylphenol/formaldehyde condensate having a softening point of 90° C.

COMPARATIVE EXAMPLE 5

206 g (1 mole) of p-tert-octylphenol, 68.9 g (0.85 mole) of 37% formalin and 2.06 g of p-toluenesulfonic acid were condensed under water reflux for 3 hours. The reaction mixture was then dehydrated by heating to complete the reaction. There was obtained a p-tert-octylphenol/formaldehyde condensate having a softening point of 101° C.

REFERENTIAL EXAMPLE 1

SC sheets and CF sheets were prepared by using the color developers produced in Examples 1 to 5 and Comparative Examples 1 to 5, and their performances in pressure-sensitive recording sheets were tested, the results are shown in Table 1.

TABLE 1

| | Performance of SC Sheet | | | | | | | | Performance of CF Sheet | | | | | | | |
|---|---|---|---|---|---|---|---|---|---|---|---|---|---|---|---|---|
| | Color Density | | | | | | Resistance to Soiling by Wet Heat | | | Color Density | | | | Yellowing Resistance | | |
| | Blue | | | Black | | | | | | Blue | | Black | | | | |
| Color Devel-oper | Not devel-oped | TI, ini-tial | TI, ulti-mate | Not devel-oped | TI, ini-tial | TI, ulti-mate | Blue | Black | Not devel-oped | TI ini-tial | TI, ulti-mate | TI, ini-tial | TI, ulti-mate | Not treated | Exposed to Sunlight | Exposed to NO$_x$ |
| Ex. 1 | 88.0 | 64.5 | 54.5 | 87.5 | 60.2 | 53.5 | 82.4 | 81.8 | 89.5 | 57.8 | 52.0 | 56.7 | 48.7 | 83.2 | 74.9 | 74.2 |
| Ex. 2 | 88.0 | 66.0 | 53.0 | 87.5 | 61.0 | 51.5 | 83.2 | 82.0 | 89.5 | 58.0 | 50.2 | 57.0 | 47.7 | 83.2 | 76.3 | 76.2 |
| Ex. 3 | 88.0 | 64.8 | 52.9 | 87.5 | 60.9 | 52.0 | 82.8 | 81.8 | 89.5 | 56.9 | 51.0 | 55.8 | 48.0 | 83.2 | 75.8 | 76.1 |
| Ex. 4 | 88.0 | 65.3 | 54.0 | 87.5 | 61.8 | 53.4 | 81.8 | 80.4 | 89.5 | 58.5 | 52.2 | 56.1 | 49.0 | 83.1 | 74.7 | 73.2 |
| Ex. 5 | 87.9 | 65.9 | 52.8 | 87.5 | 60.7 | 51.3 | 83.4 | 81.2 | 89.5 | 57.5 | 50.1 | 56.4 | 48.5 | 83.2 | 74.1 | 75.8 |
| CEx. 1 | 88.0 | 71.6 | 55.0 | 87.5 | 68.7 | 54.2 | 82.3 | 81.4 | 89.4 | 63.5 | 52.8 | 65.3 | 51.4 | 83.1 | 75.0 | 71.0 |
| CEx. 2 | 88.0 | 73.4 | 53.8 | 87.4 | 72.0 | 52.2 | 82.0 | 81.0 | 89.5 | 64.0 | 51.3 | 64.7 | 49.7 | 83.2 | 74.8 | 73.8 |
| CEx. 3 | 87.0 | 70.0 | 56.3 | 87.3 | 68.5 | 57.8 | 78.0 | 77.7 | 89.3 | 64.7 | 52.9 | 63.9 | 49.4 | 82.9 | 75.8 | 73.4 |
| CEx. 4 | 86.0(*1) | 64.0 | 51.0 | 84.0(*1) | 65.8 | 50.5 | 57.3 | 56.1 | 89.0 | 54.6 | 48.0 | 61.0 | 45.8 | 82.7 | 59.8 | 62.0 |
| CEx. 5 | 88.0 | 76.2 | 59.5 | 87.5 | 70.4 | 61.4 | 83.5 | 81.5 | 89.6 | 65.3 | 60.4 | 62.3 | 56.3 | 83.0 | 73.2 | 69.8 |

Ex. = Example;
CEx. = Comparative Example
(*1) Pale color was developed during the coating and drying of SC sheets (both in blue and black developments).

EXAMPLE 6

206 g (1 mole) of p-tert-octylphenol, 59.0 g (1.57 moles) of 80% paraformaldehyde and 5.0 g of oxalic acid dihydrate were reacted under water reflux (100° C.) for 10 hours in a glass reactor to form a reaction intermediate. Ten hours after the initiation of the reaction, 89% of the used formaldehyde was consumed, and 1.32 moles of the formaldehyde added to 1.0 mole of p-tert-octylphenol. Phenol (70.5 g; 0.75 mole) was added to the reaction intermediate, and reacted at 100° C. for 3 hours. The reaction mixture was dehydrated by heating it to 165° C. under atmospheric pressure and then under reduced pressure to give a pale-colored p-tert-octylphenol/phenol/formaldehyde co-condensate.

(EXAMPLE 6-1)

A mixture of 18.75 g of zinc benzoate and 11.25 g of ammonium hydrogen carbonate was added over the course of 1 hour to 100 g of the co-condensate obtained as above which was stirred and kept hot in a reactor. There was obtained a pale yellow transparent zinc salt of the co-condensate, which had a softening point of 92° C.

(EXAMPLE 6-2)

The co-condensate was treated in the same way as in (Example 6-1) except that 10.0 of zinc propionate and 8.5 g of ammonium acetate were used instead of the zinc benzoate and ammonium hydrogen carbonate. There was obtained a zinc salt (softening point 96° C.) of the co-condensate.

EXAMPLE 7

212 g (1 mole) of p-α,α-dimethylbenzylphenol, 106.4 g (1.31 moles) of 37% formalin and 6.3 g of 10% HCl were reacted under water reflux (100° C.) for 6 hours to give a reaction intermediate consuming 85% of the used formaldehyde (the mole ratio of added formaldehyde to p-α,α-dimethylbenzylphenol, Fa/P=1.12). Phenol (56.4 g; 0.6 mole) was added to the reaction intermediate, and reacted at 100° C. for 1 hour. The reaction mixture was dehydrated by heating it to 165° C. under atmospheric pressure and then under reduced pressure to give a p-α,α-dimethylbenzylphenol/phenol/formaldehyde cocondensate.

(EXAMPLE 7-1)

A mixture of 3.7 of zinc oxide (JIS No. 1) and 5.7 g of ammonnium formate was gradually added over the course of 1.5 hours to 100 g of the resulting co-condensate which was stirred and kept at 170° C., thereby to give a pale yellow transparent Zn salt of the co-condensate, which has a softening point of 98° C.

(EXAMPLE 7-2)

The co-condensate was treated in the same way as in (Example 7-1) except that 18 g of zinc propionate and 10 g of ammonium carbonate were used instead of the zinc oxide and ammonium formate. There was obtained a zinc salt of the co-condensate, which had a softening point of 97° C.

EXAMPLE 8

176 g (1 mole) of p-cyclohexylphenol, 42.2 g (1.13 moles) of 80% paraformaldehyde, and 3.0 g of oxalic acid were dissolved in 300 ml of benzene, and reacted at the boiling point of benzene for 12 hours to give a reaction intermediate consuming 92% of the formaldehyde used. To the reaction intermediate were added 57 g (0.25 mole) of 4,4'-isopropylidene-biphenol and 23.5 g (0.25 mole) of phenol, and the reaction was continued for 4 hours. The reaction mixture was heated to 160° C. to remove water and the solvent, and thereby to give a p-cyclohexlphenol/bisphenol A/phenol/formaldehyde co-condensate.

100 g of the resulting co-condensate was dissolved in a solution of 12 g of sodium hydroxide in 200 g of methanol. The solution was then kept at 50° C., and 410 g of a 5% methanol solution of zinc chloride (ZnCl$_2$) was added dropwise to the solution over the course of about 1 hour to perform double decomposition reaction of zinc and a sodium salt of the phenolic hydroxyl groups in methanol. The methanol solution was discharged into 4,000 g of cold water at 5° C. with stirring to precipitate a zinc salt of the p-cyclohexyl-phenol/bisphenol A/-phenol/formaldehyde co-condensate which was then filtered, washed with water and dried to obtain it in the form of a fine powder.

EXAMPLE 9

75 g (0.5 mole) of p-tert-butylphenol, 88 g (0.5 mole) of p-cyclohexylphenol, 0.33 g of p-toluenesulfonic acid and 127.5 g (1.75 moles) of 37% formalin were reacted under water reflux for 6 hours to give a reaction intermediate consuming 94% of the formaldehyde used.

Phenol (79.9 g; 0.85 mole) was added to the reaction intermediate and reacted at 100° C. for 1 hour. The reaction mixture was dehydrated by heating it to 170° C. under atmospheric pressure and then under reduced pressure to give a p-tert-butylphenol/p-cyclohexylphenol/phenol/formaldehyde co-condensate.

A mixture of 6.6 g of zinc carbonate and 15.0 g of ammonium benzoate was added dropwise over 2 hours to 100 g of the resulting co-condensate kept at 160° C. to give a zinc salt of the co-condensate, which had a softening point of 102° C.

COMPARATIVE EXAMPLE 6

206 g (1 mole) of p-tert-octylphenol, 60 g (0.64 mole) of phenol, 121.0 g (1.49 moles) of 37% formalin and 1.5 g of 35% HCl were condensed under water reflux for 10 hours, and the reaction mixture was dehydrated by heating it to 160° C. under atmospheric pressure and then under reduced pressure to give a p-tert-octylphenol/phenol/formaldehyde co-condensate. A mixture of 60 g of zinc benzoate and 45 g of ammonium hydrogen carbonsate was added gradually over the course of 1 hour to the resulting co-condensate to give a pale yellow transparent zinc salt of the p-tert-octylphenol/phenol/formaldehyde co-condensate.

COMPARATIVE EXAMPLE 7

206 g (1 mole) of p-tert-octylphenol, 30 g (0.8 mole) of 80% paraformaldehyde and 6 g of oxalic acid dihydrate were condensed at 85° C. for 10 hours in a reactor. The reaction mixture was dehydrated by heating it to 170° C. to give a p-tert-octylphenol/formaldehyde condensate.

(COMPARATIVE EXAMPLE 7-1)

A mixture of 12.75 g of zinc benzoate and 7.5 g of ammonium hydrogen carbonate was added gradually to 100 g of the resulting p-tert-octylphenol/formaldehyde condensate kept at 170° C. to give a yellow zinc salt of the p-tert-octylphenol/formaldehyde condensate.

(COMPARATIVE EXAMPLE 7-2)

A mixture of 6.5 g of ammonium formate and 3.65 g of zinc oxide (JIS No. 1) was added over the course of 10 minutes to 100 g of the p-tert-octylphenol/formaldehyde condensate kept at 160° C., and the mixture was maintained at 160° to 170° C. for 1 hour to give a brown transparent zinc salt of the p-tert-octylphenol/formaldehyde condensate.

COMPARATIVE EXAMPLE 8

A mixture of 12.5 g of zinc benzoate and 7.5 g of ammonium hydrogen carbonate was gradually added to 100 g of the p-phenylphenol/formaldehyde condensate obtained in Comparative Example 4 and kept at 170° C. to react them and thereby give a green zinc salt of the condensate.

REFERENTIAL EXAMPLE 2

SC and CF sheets were prepared by using the color-developers produced in Examples 6 to 9 and Comparative Examples 6 to 8, and tested for their performances in pressure-sensitive recording sheets. The results are shown in Tables 2 and 3.

TABLE 2

| | Performance of CF Sheet | | | | | | | | | | | | |
|---|---|---|---|---|---|---|---|---|---|---|---|---|---|
| | | Color Density | | | | | | | Solvent Resistance | | Resistance to light fading of the color-developed sheet (FM 2hrs.) | Yellowing Resistance | | |
| | Not | Blue | | | | Black | | | | | | | Exposed to | |
| Color Developer | developed | TI, initial | TI, ultimate | TI, 10 days later | CI | TI, initial | TI, ultimate | TI, 10 days later | CI | DOP | Gasoline | | Not treated | Sunlight for 12 hours | Exposed to NO$_x$ |
| Ex. 6-1 | 89.4 | 52.5 | 48.2 | 48.1 | 33.8 | 51.8 | 51.8 | 45.8 | 32.4 | 58.6 | 0 | 59.4 | 82.7 | 73.8 | 74.2 |
| Ex. 6-2 | 89.4 | 53.2 | 48.1 | 48.0 | 34.2 | 52.0 | 45.7 | 45.7 | 33.2 | 58.3 | 0 | 59.7 | 82.8 | 74.0 | 72.9 |
| Ex. 7-1 | 89.4 | 54.8 | 47.1 | 47.0 | 29.7 | 52.9 | 44.8 | 44.8 | 29.8 | 57.1 | 0 | 57.2 | 82.9 | 74.2 | 75.1 |
| Ex. 7-2 | 89.4 | 54.6 | 47.4 | 47.1 | 29.4 | 52.5 | 44.6 | 44.6 | 29.5 | 56.9 | 0 | 56.0 | 82.8 | 74.1 | 75.8 |
| Ex. 8 | 89.5 | 52.3 | 47.8 | 47.8 | 29.9 | 51.9 | 45.2 | 45.1 | 30.0 | 55.1 | 0 | 54.8 | 82.8 | 74.3 | 74.9 |
| Ex. 9 | 89.3 | 54.2 | 47.2 | 47.1 | 30.2 | 50.7 | 44.8 | 44.8 | 30.7 | 54.2 | 0 | 54.3 | 82.8 | 74.3 | 75.4 |
| CEx. 6 | 89.0 | 65.8 | 48.4 | 48.4 | 34.8 | 66.5 | 46.8 | 46.8 | 37.0 | 62.4 | Δ | 60.5 | 82.6 | 69.8 | 68.6 |
| CEx. 7-1 | 89.1 | 51.3 | 49.8(*1) | 58.4(*1) | 48.5 | 52.3 | 45.3 | 45.2 | 36.5 | 65.8 | Δ | 7.04 | 82.6 | 62.4 | 64.9 |
| CEx. 7-2 | 89.3 | 52.8 | 50.2(*1) | 58.4(*1) | 47.0 | 57.2 | 49.5 | 49.5 | 44.5 | 61.4 | Δ | 58.2 | 82.5 | 73.5 | 75.0 |
| CEx. 8 | 88.7 | 50.2 | 45.3 | 45.3 | 27.0 | 57.1 | 44.0 | 44.0 | 29.0 | 59.3 | Δ | 56.1 | 82.5 | 59.6 | 61.8 |

(*1) The colored images tended to fade spontaneously in the early stage.

TABLE 3

| | Performance of SC Sheet | | | | | | | |
|---|---|---|---|---|---|---|---|---|
| | Color Density | | | | | | Resistance to soiling by wet heat | |
| | Blue | | | Black | | | | |
| Color developer | Not developed | TI, initial | TI, ultimate | Not developed | TI, initial | TI, ultimate | Blue | Black |
| Ex. 6-1 | 87.8 | 58.7 | 51.4 | 87.6 | 58.1 | 51.2 | 81.4 | 80.8 |
| Ex. 6-2 | 87.8 | 59.1 | 51.5 | 87.6 | 58.3 | 51.1 | 81.7 | 80.4 |
| Ex. 7-1 | 87.8 | 59.0 | 49.0 | 87.5 | 58.5 | 47.8 | 82.1 | 81.1 |
| Ex. 7-2 | 87.8 | 58.6 | 48.8 | 87.6 | 58.4 | 47.6 | 81.8 | 80.4 |
| Ex. 8 | 87.7 | 57.6 | 49.0 | 87.5 | 58.7 | 48.2 | 80.9 | 80.7 |
| Ex. 9 | 87.8 | 58.2 | 48.6 | 87.6 | 59.7 | 49.8 | 81.8 | 79.9 |
| CEx. 6 | 87.6 | 68.2 | 51.0 | 87.6 | 62.3 | 50.9 | 79.6 | 79.8 |

TABLE 3-continued

| | Performance of SC Sheet | | | | | | Resistance to soiling by wet heat | |
|---|---|---|---|---|---|---|---|---|
| | Color Density | | | | | | | |
| | Blue | | | Black | | | | |
| Color developer | Not developed | TI, initial | TI, ultimate | Not developed | TI, initial | TI, ultimate | Blue | Black |
| CEx. 7-1 | 87.6 | 60.3 | 58.2[1] | 87.5 | 61.8 | 51.8 | 79.8 | 79.4 |
| CEx. 7-2 | 87.7 | 59.8 | 54.3[1] | 87.5 | 59.2 | 51.6 | 80.0 | 78.7 |
| CEx. 8 | 85.3[2] | 61.2 | 49.8 | 83.2[2] | 61.1 | 49.1 | 55.6 | 55.8 |

[1]The colored image tended to fade spontaneously in the early stage.
[2]There was a tendency to backgrounding (pale spontaneous staining tendency) during the coating and drying of the SC sheet.

What we claim is:

1. A color developer for pressure-sensitive recording sheets, said color-developer comprising a co-condensate obtained by co-condensing a reaction intermediate of at least one p-substituted phenol with at least one higher functional phenol selected from the group consisting of 4,4'-isopropylidene-biphenol, 4,4'cyclohexylidene-biphenol and 4,4'-biphenol sulfon under neutral or acidic conditions, and/or a polyvalent metal salt of the said co-condensate, said reaction intermediate being obtained by reacting said p-substituted phenol under acidic conditions with at least an equimolar amount of formaldehyde or a substance capable of generating formaldehyde.

2. A color developer for pressure-sensitive recording sheets, said color-developer comprising a polyvalent metal salt of co-condensate obtained by co-condensing a reaction intermediate of at least one p-substituted phenol with $C_6H_5OH$ under neutral of acidic conditions, said reaction intermediate being obtained by reacting said p-substituted phenol under acidic conditions with at least an equimolar amount of formaldehyde or a substance capable of generating formaldehyde, and then converting the co-condensate into a polyvalent metal salt thereof.

3. The color-developer of claim 1 wherein the amount of the higher functional phenol is from 0.3 to 1.0 mole per mole of the p-substituted phenol.

4. The color-developer of claim 2 wherein the amount of the $C_6H_5OH$ ranges from 0.3 to 1.0 mole per mole of the p-substituted phenol.

5. The color developer of claim 1 wherein the mole ratio (F/p) of the moles of formaldehyde or the formaldehyde generating substance to the total moles of the p-substituted phenol and wherein the moles of the higher functional phenol is within the range of from 0.7 to 1.0.

6. The color developer of claim 2 wherein the mole ratio (F/p) of the moles of formaldehyde or the formaldehyde generating substance to the total moles of $C_6H_5OH$ is within the range of from 0.7 to 1.0.

7. The color developer of claim 1 wherein said p-substituted phenol and said formaldehyde or formaldehyde generating substance are reacted in the presence of 0.2 to 10 parts by weight of an acid per 100 parts by weight of the combined amount of the p-substituted phenol and the higher functional phenol used in the subsequent co-condensation reaction.

8. The color developer of claim 2 wherein said p-substituted phenol and said formaldehyde or formaldehyde generating substance are reacted in the presence of 0.2 to 10 parts by weight of an acid per 100 parts by weight of the combined amount of the p-substituted phenol and $C_6H_5OH$ used in the subsequent co-condensation reaction.

9. The color developer of claim 1 wherein said reaction intermediate is co-condensed with said higher functional phenol at 80° C. to 120° C.

10. The color developer of claim 2 wherein said reaction intermediate is co-condensed with said $C_6H_5OH$ at 80° C. to 120° C.

11. The color developer of claim 1 wherein the polyvalent metal salt of the co-condensate is a salt of the co-condensate with zinc, nickel, magnesium, calcium or aluminum.

12. The color developer of claim 2 wherein the polyvalent metal salt of the co-condensate is a salt of the co-condensate with zinc, nickel, magnesium, calcium or aluminum.

13. The color developer of claim 1 wherein the metal content of the polyvalent metal salt of the co-condensate is from 1.0 to 8.0% by weight.

14. The color developer of claim 2 wherein the metal content of the polyvalent metal salt of the co-condensate is from 1.0 to 8.0% by weight.

* * * * *